US012559016B2

(12) United States Patent
Paul et al.

(10) Patent No.: US 12,559,016 B2
(45) Date of Patent: Feb. 24, 2026

(54) VEHICLE TRANSPORTATION STORAGE SYSTEM AND METHOD

(71) Applicant: Transportation IP Holdings, LLC, Norwalk, CT (US)

(72) Inventors: Anthony D. Paul, Anchorage, AK (US); Milan Karunaratne, Orange, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 951 days.

(21) Appl. No.: 17/505,283

(22) Filed: Oct. 19, 2021

(65) Prior Publication Data

US 2023/0121499 A1 Apr. 20, 2023

(51) Int. Cl.
*B60P 1/54* (2006.01)
*A47G 29/14* (2006.01)
(Continued)

(52) U.S. Cl.
CPC .......... *B60P 1/6418* (2013.01); *A47G 29/141* (2013.01); *B60P 3/007* (2013.01); *G06Q 10/0836* (2013.01); *G06Q 10/087* (2013.01); *G07C 5/08* (2013.01); *G07C 9/00896* (2013.01); *G07C 9/22* (2020.01); *G07C 2009/0092* (2013.01)

(58) Field of Classification Search
CPC ........... A47G 29/141; A47G 2029/145; A47G 2029/149; B60P 1/6418; B60P 3/007; G07C 9/22; G07C 9/00896; G07C 2009/0092; G07C 5/08; G06Q 10/0836; G06Q 10/087
See application file for complete search history.

(56) References Cited

U.S. PATENT DOCUMENTS 9,127,872 B1 * 9/2015 Chainey ................ F25D 11/003
10,017,099 B2 * 7/2018 Yilma ..................... B60J 7/141
(Continued)

FOREIGN PATENT DOCUMENTS

CN 203580741 U * 5/2014

OTHER PUBLICATIONS

"Why Amazon Hub?", Amazon, <https://www.amazon.com/ulp>, date accessed: Nov. 9, 2021 (5 pages).
(Continued)

*Primary Examiner* — William L Miller
(74) *Attorney, Agent, or Firm* — K&L Gates LLP

(57) ABSTRACT

A transportation storage system and method includes a vehicle having a platform on a chassis, plural storage containers disposed on the platform, and electronic locksets mounted to the storage containers. Each of the storage containers includes multiple module walls that define a cavity to receive an object, and a container door mounted to the module walls at an access end of the storage container to enclose the cavity when in a closed state. The electronic locksets lock the container doors in the closed state, and provide access to the object within the respective cavity in response to receiving a corresponding unlock signal. The storage containers are oriented on the platform such that the container doors are accessible to an individual that is off-board the vehicle or that is on the platform to extract the object from the cavity or to deposit the object into the cavity.

7 Claims, 6 Drawing Sheets

(51) Int. Cl.

| | |
|---|---|
| *B60P 1/64* | (2006.01) |
| *B60P 3/00* | (2006.01) |
| *G06Q 10/0836* | (2023.01) |
| *G06Q 10/087* | (2023.01) |
| *G07C 5/08* | (2006.01) |
| *G07C 9/00* | (2020.01) |
| *G07C 9/22* | (2020.01) |

(56) References Cited

U.S. PATENT DOCUMENTS

| | | | | |
|---|---|---|---|---|
| 10,112,525 | B1 * | 10/2018 | Bullock | G01S 11/06 |
| 10,538,190 | B1 * | 1/2020 | Metellus | B60F 5/02 |
| 10,624,484 | B1 * | 4/2020 | Mountford | B60P 3/03 |
| 10,629,016 | B1 * | 4/2020 | Helm | B60R 9/065 |
| 10,730,376 | B2 * | 8/2020 | Salter | B60J 7/141 |
| 11,312,573 | B2 * | 4/2022 | Schedlbauer | B65G 67/02 |
| 11,472,443 | B2 * | 10/2022 | Pickett | B60P 3/20 |
| 11,518,291 | B2 * | 12/2022 | Buttolo | B60J 5/0491 |
| 11,958,702 | B2 * | 4/2024 | Salter | G06Q 10/0832 |
| 12,017,572 | B2 * | 6/2024 | Piontek | B65D 90/004 |
| 12,172,564 | B2 * | 12/2024 | Hopkins | G06Q 10/08 |
| 2010/0191615 | A1 * | 7/2010 | Thomas | B65D 90/008 |
| | | | | 52/27 |
| 2016/0114666 | A1 * | 4/2016 | Xu | B60J 7/141 |
| | | | | 296/100.07 |
| 2017/0286905 | A1 * | 10/2017 | Richardson | G06Q 10/0836 |
| 2018/0070753 | A1 * | 3/2018 | Eveloff | H04W 4/025 |
| 2019/0051090 | A1 * | 2/2019 | Goldberg | B62D 63/04 |
| 2019/0113935 | A1 * | 4/2019 | Kuo | G06Q 50/40 |
| 2019/0130349 | A1 | 5/2019 | Ferguson et al. | |
| 2019/0164114 | A1 * | 5/2019 | Kadotani | G05D 1/0088 |
| 2019/0265702 | A1 * | 8/2019 | Igata | G05D 1/0276 |
| 2019/0278274 | A1 * | 9/2019 | Igata | B60P 3/007 |
| 2020/0130893 | A1 * | 4/2020 | Väin | G06Q 10/08 |
| 2020/0218281 | A1 * | 7/2020 | Ono | G06Q 10/0833 |
| 2020/0385207 | A1 * | 12/2020 | Godwin | B60P 3/007 |
| 2020/0393854 | A1 * | 12/2020 | Romanucci | B66F 9/24 |
| 2021/0018922 | A1 * | 1/2021 | Scheer | B65G 1/1371 |
| 2021/0150655 | A1 * | 5/2021 | Matsutani | B60P 1/6481 |
| 2021/0197971 | A1 * | 7/2021 | Vorwerk | G07C 9/32 |
| 2021/0256472 | A1 * | 8/2021 | Javidan | H04W 4/12 |
| 2022/0009398 | A1 * | 1/2022 | Piontek | B60P 1/6418 |
| 2022/0084340 | A1 * | 3/2022 | Hall | B60P 1/003 |
| 2022/0153312 | A1 * | 5/2022 | Pickett | B60P 3/20 |
| 2022/0250527 | A1 * | 8/2022 | Lundeen | B60P 1/38 |
| 2022/0275990 | A1 * | 9/2022 | Tazume | A47G 29/141 |
| 2023/0080797 | A1 * | 3/2023 | Tatsumoto | G07C 9/00912 |
| | | | | 340/5.7 |
| 2023/0143630 | A1 * | 5/2023 | Cieszkowski, III | B60P 3/007 |
| | | | | 296/24.36 |
| 2023/0191923 | A1 * | 6/2023 | Kazyak | B60L 53/14 |
| | | | | 180/68.5 |
| 2023/0206172 | A1 * | 6/2023 | Kashi | G06Q 10/0836 |
| | | | | 705/339 |
| 2023/0322145 | A1 * | 10/2023 | Maan | G06Q 10/0832 |
| | | | | 700/245 |
| 2024/0416819 | A1 * | 12/2024 | Zuniga | B60P 1/6409 |

OTHER PUBLICATIONS

Holsenbeck, "Everything you need to know about Amazon Hub Locker", Amazon, <• https://www.amazon.com/primeinsider/tips/amazon-locker-qa.html>, date accessed: Nov. 9, 2021 (2 pages).

* cited by examiner

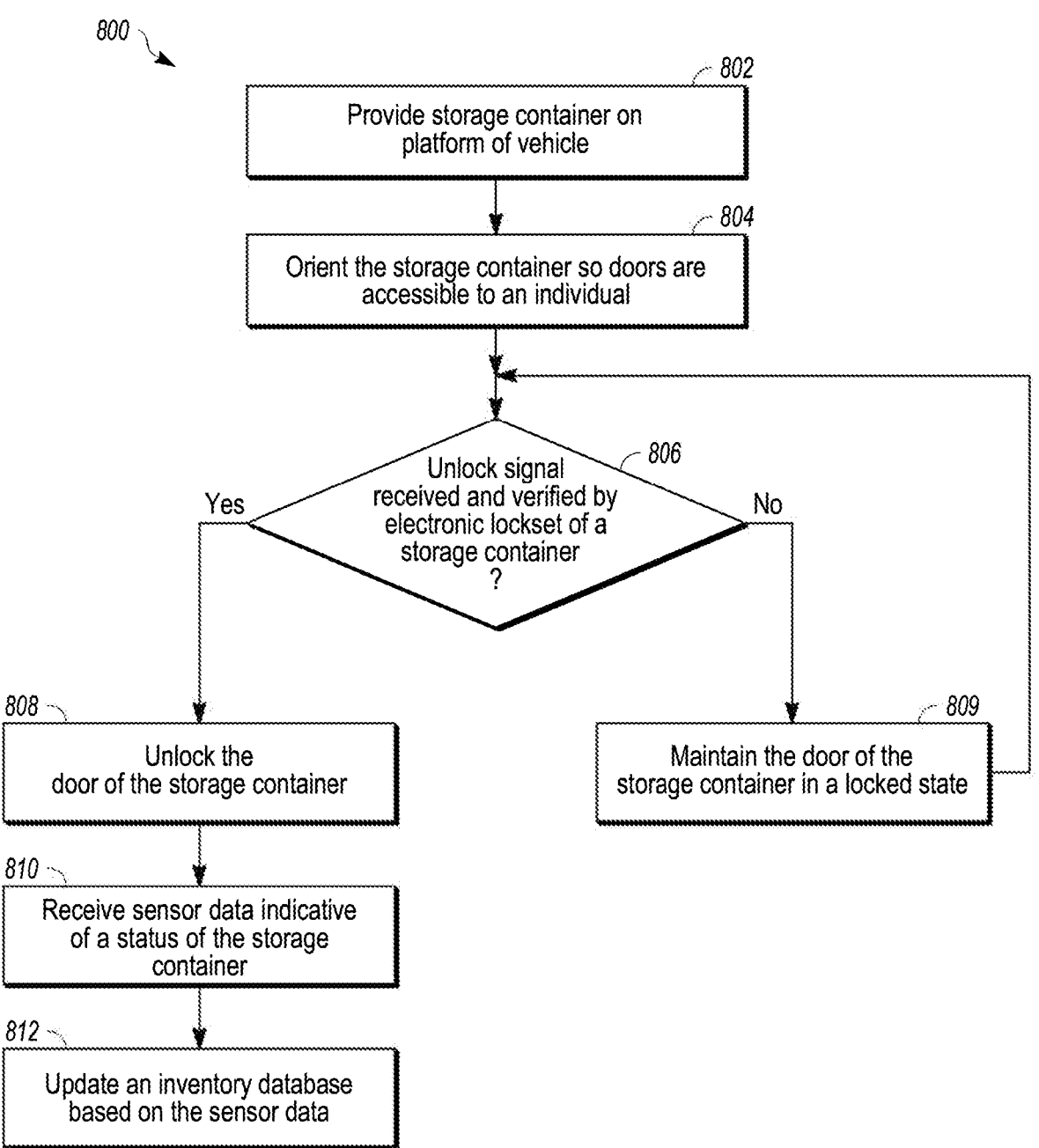

*800*

*802*
Provide storage container on
platform of vehicle

*804*
Orient the storage container so doors are
accessible to an individual

*806*
Unlock signal
received and verified by
electronic lockset of a
storage container
?

Yes

No

*808*
Unlock the
door of the storage container

*809*
Maintain the door of the
storage container in a locked state

*810*
Receive sensor data indicative
of a status of the storage
container

*812*
Update an inventory database
based on the sensor data

*FIG. 9*

VEHICLE TRANSPORTATION STORAGE SYSTEM AND METHOD

BACKGROUND

Technical Field

The subject matter described herein relates to storage and transportation systems and methods for transporting objects within individual storage containers.

Discussion of Art

Vehicles used to transport consumer goods (e.g., parcels, packages, devices, products, etc.) in commerce typically serve a limited role in the delivery supply chain. The role of a transport vehicle may be limited to transporting the goods from a first location, where the goods are picked up by the vehicle, to a second location, where the goods are dropped off. The pick-up location may be a post office, a manufacturer facility, terminal facility in which the goods are transferred from another type of vehicle, or the like. The drop-off location may be a facility of a third party carrier that delivers the goods to specific homes, businesses, and the like, a terminal facility, a retailer, or the like.

To transport a consumer good door-to-door between a sender entity and a receiver entity, the item may be processed, sorted, loaded onto a vehicle, and unloaded from a vehicle multiple times along the delivery supply chain as the item is handed off between carriers and other entities. These operations and transitions may slow the shipment of the consumer good, undesirably delaying the arrival of the item at the receiver entity. Furthermore, each of the processing, sorting, loading, and unloading operations represents another opportunity for the item to be mishandled, lost, or damaged. It may be desirable to reduce the complexity of the delivery supply chain. It may be desirable to enhance the role of a transport vehicle in the delivery supply chain beyond simply transporting cargo in bulk from point A to point B.

BRIEF DESCRIPTION

In one or more embodiments, a transportation storage system is provided that includes a vehicle, plural storage containers, and electronic locksets mounted to the storage containers. The vehicle includes a chassis and a platform on the chassis. The storage containers are disposed on the platform. Each of the storage containers includes multiple module walls and a container door. The module walls define a cavity configured to receive an object. The container door is mounted to the module walls at an access end of the storage container and encloses the cavity when the container door is in a closed state. The electronic locksets are configured to lock the container doors in the closed state. Each of the electronic locksets is configured to provide access to the object within the cavity in response to receiving a corresponding unlock signal. The storage containers are oriented on the platform such that the container doors are accessible to an individual that is off-board the vehicle or that is on the platform to extract the object from the cavity or to deposit the object into the cavity.

In one or more embodiments, a method (e.g., for providing individualized access to storage containers of a vehicle) is provided. The method includes providing plural storage containers on a platform of a vehicle. Each of the storage containers includes multiple module walls and a container door. The module walls define a cavity configured to receive an object. The container door is mounted to the module walls at an access end of the storage container and encloses the cavity when the container door is in a closed state. The storage containers also include electronic locksets mounted to the storage containers and configured to lock the container doors in the closed state. The method includes orienting the storage containers on the platform such that the container doors are accessible to an individual that is off-board the vehicle or that is on the platform to extract the object from the cavity or to deposit the object into the cavity. Responsive to receiving an unlock signal, the method includes unlocking the respective container door of one of the storage containers associated with the unlock signal, via a corresponding one of the electronic locksets, to permit opening the container door for extracting the object or depositing the object.

In one or more embodiments, a transportation storage system is provided that includes a vehicle having a platform, plural storage containers disposed on the platform, lockset mounted to the storage containers, and a door panel mounted along an exterior side of the vehicle. Each of the storage containers includes multiple module walls and a container door. The module walls define a cavity configured to receive an object. The container door is mounted to the module walls at an access end of the storage container and encloses the cavity when the container door is in a closed state. The platform includes a walkway along a top side of the platform between a first subset of the storage containers and a second subset of the storage containers. The storage containers in the first and second subsets are oriented such that the access ends face towards the walkway. The lockets are configured to lock the container doors in the closed state. Each of the locksets is unlockable, to permit opening the container door of a corresponding storage container, via receipt of a key that is uniquely associated with the storage container. The door panel aligns with the walkway and is movable between a raised position in which the door panel defines an outer wall of the vehicle and a lowered position in which the door panel defines an entryway. The entryway is for permitting an individual to enter the walkway and access the first and second subsets of the storage containers on the platform.

BRIEF DESCRIPTION OF THE DRAWINGS

The inventive subject matter may be understood from reading the following description of non-limiting embodiments, with reference to the attached drawings, wherein below:

FIG. 9 is a flow chart of a method for providing individualized access to storage containers of a vehicle according to an embodiment.

DETAILED DESCRIPTION

Figure 1:
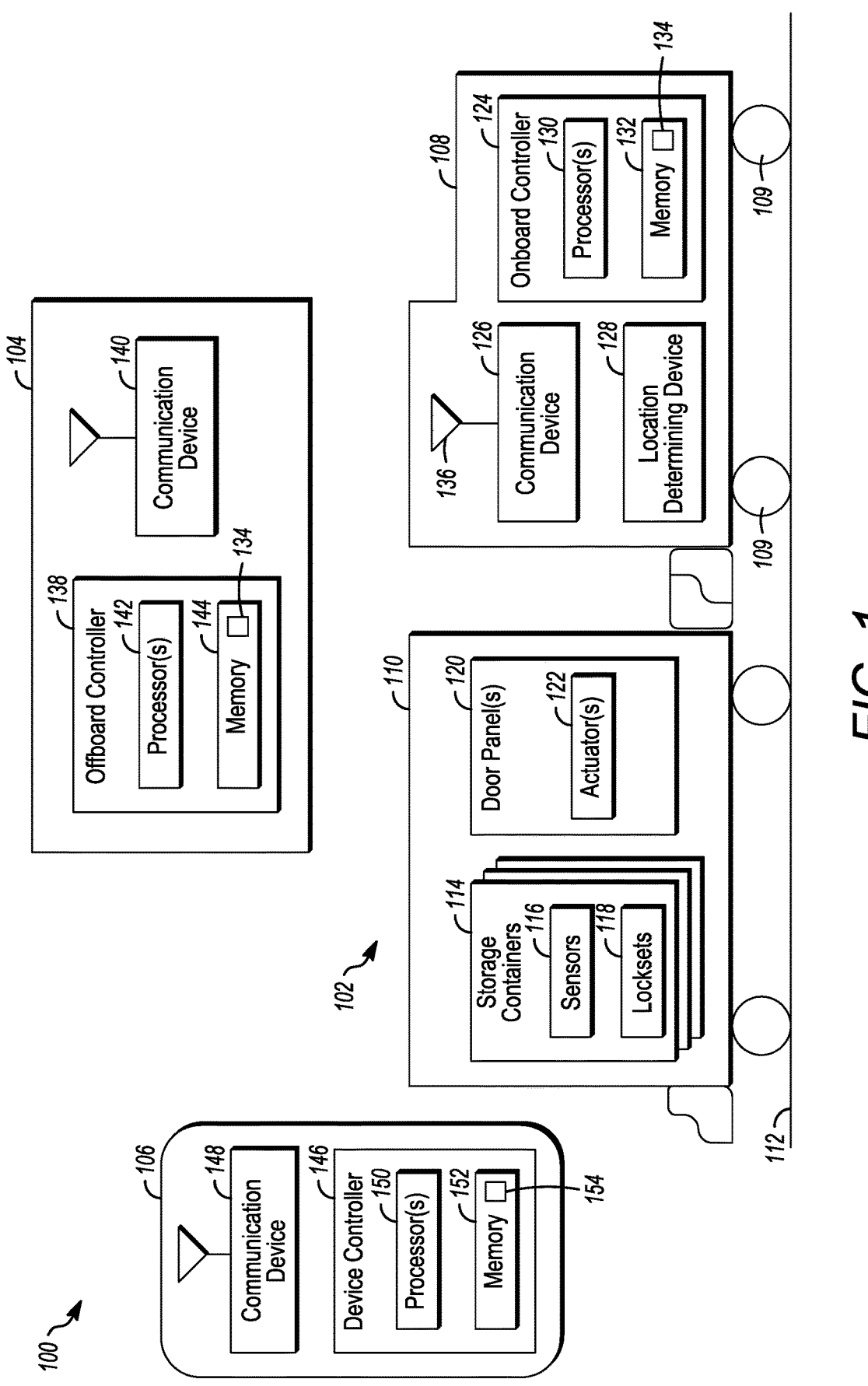
FIG. 1 is a schematic illustration of a transportation storage system according to an embodiment in which the transportation storage system is distributed among a vehicle system, an offboard entity, and an external personal computing device.

One or more embodiments described herein are directed to a transportation storage system and method that includes storage containers onboard the vehicle. The storage containers are arranged and oriented to permit individualized access to the contents of each storage container. For example, a person can walk up to and/or onto the vehicle, and provide information to the storage container to access one or more contents in the storage container. With the storage container unlocked, the person can deposit an object into an interior cavity of the storage container and/or extract an object from the interior cavity. The transportation storage system may be integrated with a software program (e.g., application) that enables people to reserve a storage container, monitor the location of the container vehicle, track the status of an object transported by the container vehicle, and the like.

At least one technical effect of the transportation storage system and method disclosed herein is decentralizing access points for dropping off an object to be shipped and/or picking up the object. A benefit of decentralizing access points is that a person can proactively travel to the container vehicle for the drop-off and/or pick-up. For example, if the container vehicle is a railcar, a person can access a reserved storage container when the railcar is stopped at a station. In another example in which the container vehicle is a road-based vehicle, such as a truck-pulled trailer or a bus, a person can access a reserved storage container while the vehicle is parked on the side of a road, in a parking lot, or the like. Decentralizing access points may increase the speed and efficiency of shipping, as well as reduce costs, by avoiding one or more stages of the delivery supply chain. For example, when an item ordered online is received by a person at the container vehicle, a carrier entity is not used to deliver the item to the door of the recipient. Stated differently, the transportation storage system disclosed herein supports delivery to and from regions, rather than individual buildings, which can simplify the shipping chain.

Another benefit of the transportation storage system disclosed herein is that the container vehicle can be used as a mobile retail outlet that permits a producer to sell directly to consumers without a third party retailer. For example, the container vehicle may be used as a mobile vending machine in which a person purchases an item within a storage container and then is granted permission to unlock and retrieve the item from the storage container. Because the container vehicle is mobile, the container vehicle can travel to regions of high demand for the items on sale within the storage containers, bringing the products to potential consumers. The transportation storage system also may be utilized by producers that sell online. For example, a producer may load items purchased by consumers living in a first region into different corresponding storage containers, and then may notify the consumers that their items will be available in the container vehicle at a specific upcoming time and date. The consumers are able to pick up the purchased items directly from the container vehicle rather than waiting for door delivery, which may take a few extra days.

FIG. 1 is a schematic illustration of a transportation storage system 100 according to an embodiment in which the transportation storage system is distributed among a vehicle system 102, an offboard entity 104, and an external personal computing device 106. The transportation storage system may include components onboard the vehicle system, the offboard entity, and the external personal computing device (referred to herein as external device).

The vehicle system includes a propulsion-generating vehicle 108 and a container vehicle 110. The propulsion-generating vehicle is coupled to the container vehicle. The propulsion-generating vehicle includes a propulsion system that generates tractive effort and/or power to propel the vehicle system along a route 112. A suitable propulsion system can include one or more traction motors, inverters, combustion engines, battery systems, air brake systems, friction brake systems, dynamic or regenerative brake systems (e.g., using motors), and/or the like. In the illustrated embodiment, the propulsion is provided by exerting a torque on wheels 109 of the propulsion-generating vehicle to rotate the wheels relative to the route. The container vehicle may be a non-propulsion-generating vehicle that does not contribute to the propulsion of the vehicle system along the route. The container vehicle may include a brake system, but lacks a traction motor and a combustion engine. The vehicle system optionally may include more than two vehicles coupled together.

In one embodiment, the vehicle system is a train, and the route is a railroad track. For example, the propulsion-generating vehicle may be a locomotive, and the container vehicle may be a railcar. The locomotive and railcar travel on rails of the track. In another embodiment, the vehicle system is a road train, and the route is a paved road or an unpaved path. For example, the propulsion-generating vehicle may be a truck (e.g., highway tractor or semi-truck), and the container vehicle may be a trailer coupled to the truck. In yet another embodiment, the container vehicle may include a propulsion system such that the container vehicle is capable of propelling itself along the route. The propulsion-generating container vehicle may represent the only vehicle of the vehicle system. In this embodiment, the container vehicle may be a bus, flatbed truck, a van, or the like.

The container vehicle includes plural storage containers 114. The storage containers provide locked cavities to store transported objects. The storage containers are designed to provide individualized access to specific sender and recipient parties. For example, one storage container can be used to transport a first good from a first sender to a first recipient, and another storage container on the same container vehicle is used to transport a second good from a second sender to a second recipient. Optionally, a single sender can use multiple storage containers to send goods to different recipients, and/or a single recipient can receive goods from multiple senders via multiple storage containers. The storage containers may be lockers (e.g., locker modules).

Suitable objects for transport within a storage container can include a package, a parcel, a good, a product, a device, and the like. The storage container can be used to transport different products at different times. The storage container is in addition to the packaging of the object that a consumer would see when the object is on a store shelf. For example, the storage container does not include any logos or pictures of a specific product inside (e.g., the storage container is not the packaging of a product with pictures, logos, and/or model identification of the product itself).

Each storage container includes a lockset 118 for selectively providing access to the contents of the storage container. In an embodiment, the lockset locks and unlocks a container door of the storage container to secure the object and reduce the risk of theft. In another embodiment, an unlock signal may cause the storage container to dispense the product/object, without allowing access inside the cavity of the storage container. This dispensing embodiment may be used, particularly for deliveries, to reduce the risk of theft or damage of products in the containers and/or may also reduce the risk of damage to the containers themselves.

Each storage container may include one or more sensors 116 for monitoring a status of the storage container. The container vehicle according to an embodiment also includes one or more door panels 120. The door panels may be used as bridges and/or ramps for permitting an individual to enter the container vehicle to deposit and/or extract an object. The door panels optionally may be automatically controlled via one or more actuators 122. For example, the actuators may pivot or otherwise move the door panels between a raised state and a lowered state, relative to a chassis of the vehicle. The door panels may be used as bridges and/or ramps when in the lowered state.

The other components of the transportation storage system may serve to track the location of the container vehicle, relay the location of the container vehicle to interested parties, reserve use of the storage containers, unlock the storage containers, update inventory information about the objects in the storage containers, and/or the like. These functions may be performed, at least in part, through communications between the vehicle system, the offboard entity, and the external device.

For example, the vehicle system includes an onboard controller 124, a communication device 126, and a location determining device 128. All three components may be included in the transportation storage system. All three components are disposed onboard the vehicle system. Although all three components are shown on the propulsion-generating vehicle, optionally one or more of the three components may be located on the container vehicle or another vehicle of the vehicle system in an alternative embodiment. The onboard controller may be operably connected to the communication device and the location determining device via wired and/or wireless communication pathways. The onboard controller may be operably connected to the propulsion and braking subsystem of the vehicle. The onboard controller represents hardware circuitry that includes and/or is connected with one or more processors 130 (e.g., one or more microprocessors, integrated circuits, microcontrollers, field programmable gate arrays, etc.). The onboard controller includes and/or is connected with a tangible and non-transitory computer-readable storage medium (e.g., memory) 132. The memory may store programmed instructions (e.g., software) that is executed by the one or more processors to perform the operations of the controller described herein. The memory additionally or alternatively may store different information, such as an inventory database 134, information (e.g., key codes) for the locksets of the storage containers, a trip schedule, a route database, forecasted weather data, a vehicle manifest, and/or the like. The inventory database may include an up-to-date record of the objects that are currently held within the storage containers. The inventory database may also include historical data about completed deliveries using the storage containers.

The communication device of the vehicle system represents hardware circuitry that can wirelessly communicate electrical signals. For example, the communication device can represent transceiving circuitry, one or more antennas 136, and the like. The transceiving circuitry may include a transceiver or a separate transmitter and receiver. The electrical signals can form data packets that in the aggregate represent messages. In an embodiment, the communication device is a radio that wirelessly communicates the electrical signals as radio frequency (RF) signals. The communication device may transmit or broadcast messages that are generated by the onboard controller. The communication device may receive messages and forward the received messages to the onboard controller for analysis.

The location determining device may determine the respective location of the vehicle system along the route. The location determining device can include a receiver, at least one antenna, and associated circuitry. A suitable location determining device may be a GNSS receiver (e.g., a global positioning system (GPS) receiver) that generates data indicative of a location (e.g., a three-dimensional positional coordinate) for the vehicle system within a global coordinate system based on signals received from satellites. In an alternative embodiment, the location determining device can determine the respective location based on other mechanisms, such as using signals received from wayside devices, by tracking the direction and distance traveled from a checkpoint location that has determined or assigned coordinates, from a dead reckoning system, or the like.

The onboard controller may package location data generated by the location determining device into a message that is communicated by the communication device to the offboard entity to advise the offboard entity regarding a current location of the vehicle system. The onboard controller may also use the communication device to communicate a message that includes the inventory database from the memory.

The offboard entity may include at least one computer, server, or the like. The offboard entity is offboard the vehicle system. The offboard entity may be located at a transportation dispatch facility, a data storage center, or the like. The offboard entity has a controller 138 (referred to herein as an offboard controller). The offboard entity also includes a communication device 140 for sending and receiving signals (e.g., messages) with the vehicle system and/or the external device. The communication device may have similar components as the communication device onboard the vehicle system. The offboard controller represents hardware circuitry that includes and/or is connected with one or more processors 142 (e.g., one or more microprocessors, integrated circuits, microcontrollers, field programmable gate arrays, etc.). The offboard controller includes and/or is connected with a tangible and non-transitory computer-readable storage medium (e.g., memory) 144. The memory may store programmed instructions (e.g., software) that is executed by the one or more processors to perform various operations. The memory additionally or alternatively may store different information, such as the inventory database and/or the information for the locksets of the storage containers. The inventory database stored in the memory of the offboard entity may be a most recent copy of the inventory database received from the vehicle system.

The external device may be a smartphone, tablet computer, wearable computing device, desktop computer, or the like. The external device may be used by a person that is a sender, planning to deposit an object in a storage container for shipment, and/or a receiver, planning to extract an object from a storage container. The external device includes a controller (referred to herein as device controller) 146. The external device also includes a communication device 148 for sending and receiving signals (e.g., messages) with the offboard entity and/or the vehicle system. The communication device may have similar components as the communication device onboard the vehicle system and/or the communication device of the offboard entity. The device controller represents hardware circuitry that includes and/or is connected with one or more processors 150 (e.g., one or more microprocessors, integrated circuits, microcontrollers, field programmable gate arrays, etc.). The device controller includes and/or is connected with a tangible and non-transitory computer-readable storage medium (e.g., memory) 152. The memory may store programmed instructions (e.g., software) that is executed by the one or more processors of the external device to perform various operations. In an embodiment, the memory stores a storage system application 154. The storage system application is a software program that is executed by the one or more processors to send and receive information about the storage system. For example, a user of the external device may initiate the storage system application to access a user interface that enables the user to select options for interacting with the storage system. The user may interact with the storage system, via the storage system application, to reserve a storage container for shipping an object, purchase an object from within one of the storage containers, track the location of the container vehicle, look up an anticipated time at which the container vehicle will arrive at a designated location, check the status of a shipment being transported by the container vehicle, initiate an unlock signal to unlock an electronic lockset of a particular storage container, and the like.

In an embodiment, the offboard entity may serve as an intermediary between the vehicle system and the external device. For example, as the vehicle system travels the vehicle system may be relatively far away from a user that has the external device. The vehicle system may communicate status information to the offboard entity through an established wireless communication link. Suitable status information may include a current location of the vehicle system, according to the location determining device, occupancy status of the storage containers (e.g., whether or not each storage container is occupied by at least one object), lock status of the storage container doors (e.g., whether or not each storage container is closed and locked), a planned route of the vehicle system (e.g., including detours and deviations from a previously planned route), and the like. The status information relating to the storage containers may be generated by the sensors and/or locksets, which may be communicatively connected to the onboard controller.

An interested sender or receiver may activate the storage system application on the external device to communicate with the offboard entity via an Internet connection. The external device may receive at least some of the status information about the storage system from the offboard entity. The status information enables the sender or receiver to track the location of the vehicle system. The tracking allows the person to meet the container vehicle at a location within a narrow time window of when the container vehicle arrives at the location to provide a quick and efficient object drop-off and/or pick-up procedure.

Optionally, the external device may directly communicate with the vehicle system, at least for some interactions. In an example pick-up procedure, the external device of an object recipient may receive an unlock signal from the offboard entity. The unlock signal may be specific to one of the storage containers that contains the object to be picked up by the recipient. Once the recipient meets up with the parked vehicle system and is proximate to the corresponding storage container, the recipient may control the external device to transmit the unlock signal. The unlock signal may be transmitted from the external device to the lockset of the corresponding storage container. The lockset may be electronic, and may unlock a door of the storage container upon receipt and verification of the unlock signal. The recipient is then able to access the object within the storage container and extract the object from the storage container.

A drop-off procedure, in which an object sender deposits an object into one of the storage containers for transport, by be similar to the pick-up procedure described above. For example, the sender may receive a notification from the offboard entity that identifies a particular storage container reserved for the sender. Upon arriving to the container vehicle, the sender may locate the particular storage container via a unique identifier, and then may use the external device to transmit the unlock signal to permit access to the interior cavity of the storage container. The sender then deposits the object into the cavity and closes the container door. The lockset may automatically lock the storage container for security to prevent theft and tampering.

Figure 2:
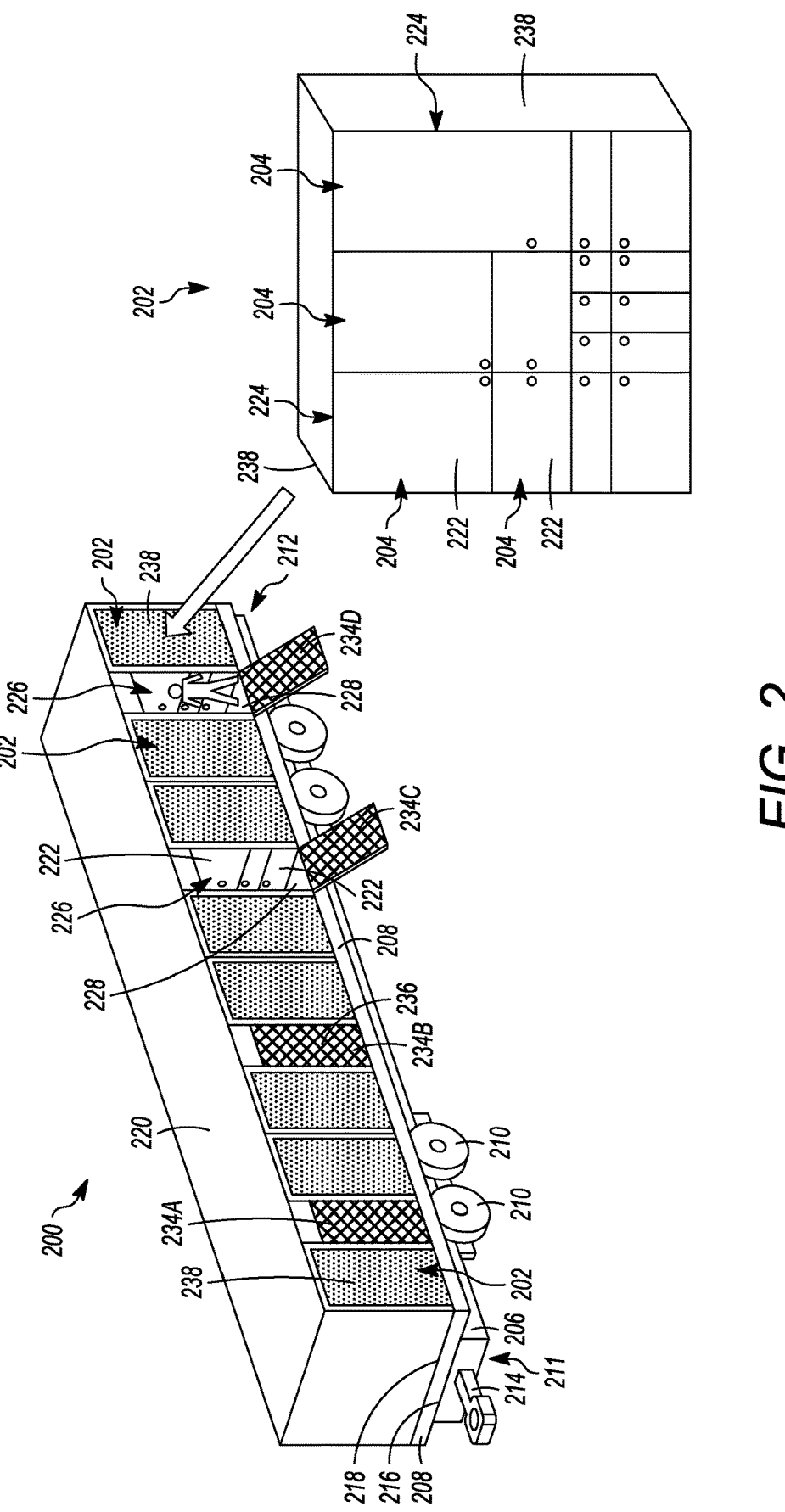
FIG. 2 is an exploded view of a container vehicle showing an isolated group of storage containers of a container vehicle according to an embodiment.

FIG. 2 is a partially exploded view of a container vehicle 200 showing an isolated group 202 of storage containers 204 of the container vehicle according to an embodiment. The container vehicle in FIG. 2 may be the container vehicle of the vehicle system shown in FIG. 1. The container vehicle 200 includes a chassis 206 and a platform 208 on the chassis. The chassis is coupled to at least one set of wheels 210. The wheels enable the container vehicle to move by rolling along a route, such as a track, a road, a path, or the like. The chassis in the illustrated embodiment is coupled to four sets of wheels, with only one wheel of each set visible in the illustrated perspective view. The wheels optionally may be coupled together in groups within trucks, such as two sets of wheels in each of two trucks. The chassis longitudinally extends from a first end 211 of the chassis to a second end 212 that is opposite the first end.

In an embodiment, the container vehicle includes at least one coupler 214. For example, a coupler may be mounted to one end of the chassis only, or two couplers may be mounted to the two ends of the chassis. Each coupler is releasably mechanically connectable to another vehicle to tether the container vehicle to at least a second vehicle. In an embodiment, the container vehicle is a non-propulsion-generating vehicle, and the container vehicle couples to a propulsion-generating vehicle that propels the movement of the storage container. The platform is mounted to the chassis and holds and supports the storage containers. The platform may be mounted on a top side 216 of the chassis, and the storage containers may be disposed on a top side 218 of the platform. The platform may be generally flat and planar. Optionally, the platform may extend a full length of the chassis from the first end to the second end. The container vehicle includes a roof 220 that covers the storage containers. The storage containers are held between the platform and the roof. The roof may protect the storage containers from rain and other precipitation, UV radiation, and the like. The roof may also shelter people from the elements while depositing an object and extracting an object from the storage containers.

In the illustrated embodiment, the storage containers are arranged in multiple groups like the group shown in isolation. Each group includes multiple storage containers disposed in an array of one or more columns and/or rows. The illustrated group of storage containers has multiple columns and rows of storage containers in the array. At least some of the storage containers may have different sizes for transporting different sizes of objects. The storage containers may have a tiered fee schedule such that larger storage containers cost more to reserve than smaller storage containers. The larger storage containers may be located above smaller storage containers to make it easier for an individual to reach all of the storage containers in the array (than if smaller containers are above larger containers). Each storage container has a respective container door 222 mounted at an access end 224 of the storage container. The container door is movable relative to side walls of the storage container to selectively open and close. In a closed state, the container door encloses a cavity of the storage container. In an open state, the container door exposes the cavity to permit access to the cavity. A few of the container doors are visible onboard the container vehicle within hallways 226 of the container vehicle.

In the illustrated embodiment, the container vehicle includes multiple hallways to permit users to enter the container vehicle to approach the storage containers. The container vehicle has walkways 228 for the users to walk along through the hallways. In an embodiment, the storage containers are oriented such that the access ends of the storage containers, including the container doors, to face towards the hallways and walkways. The walkways may be disposed along the top side of the platform. The hallways may be located between different groups of the storage containers. The container vehicle in the illustrated embodiment includes four hallways spaced apart along the longitudinal length of the platform. The longitudinal length is the dimension that extends from the first end of the chassis to the second end of the chassis. The storage containers are arranged in eight groups, with a different group on either side of each hallway. Permitting an individual to enter the container vehicle to access the storage containers avoids potential issues with the storage containers being too high to reach for individuals that are wayside.

Figure 3:
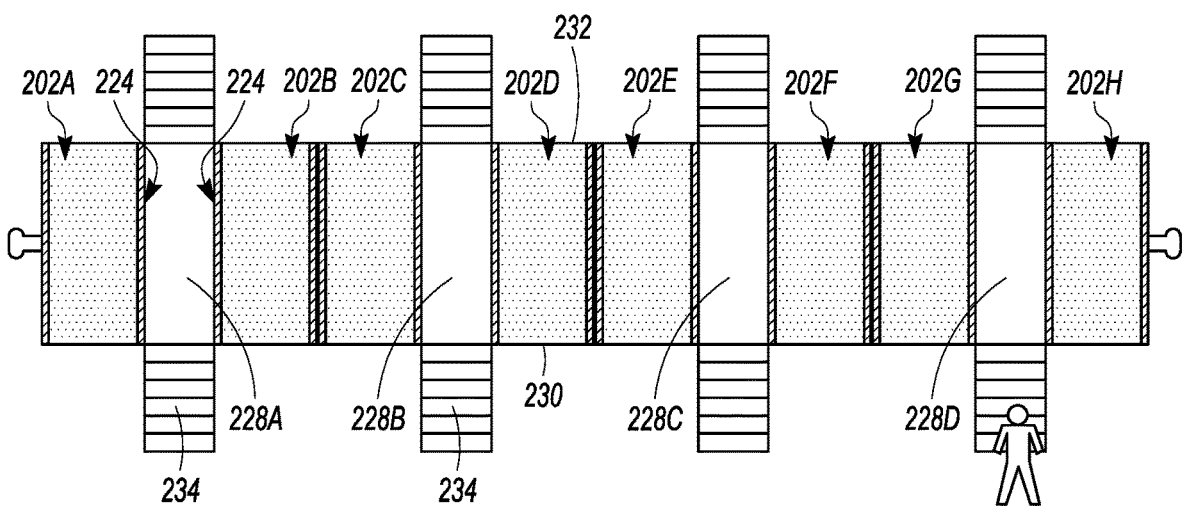
FIG. 3 is a plan view of the container vehicle of FIG. 2 with a roof of the container vehicle removed.

FIG. 3 is a top down view of the container vehicle of FIG. 2 with the roof removed. As shown in FIG. 3, a first walkway 228A is disposed between a first group 202A of the storage containers and a second group 202B of the storage containers. As such, the first group and the second group of storage containers are separated from each other by the first walkway. The user in the first walkway can access any of the storage containers in the first group and the second group. A second walkway 228B is disposed between a third group 202C and a fourth group 202D of the storage containers. A third walkway 228C is disposed between fifth and sixth groups 202E, 202F of the storage containers. A fourth walkway 228D is disposed between seventh and eighth groups 202G, 202H of the storage containers. The walkways may be parallel to one another. The walkways laterally extend from a first exterior side 230 of the container vehicle to a second exterior side 232 that is opposite the first exterior side. The walkways and hallways may be orthogonal to the longitudinal length of the container vehicle. In an embodiment, each group of the storage containers laterally extends from the first exterior side to the second exterior side. The storage containers are oriented such that the access ends are the ends/edges closest to the hallways. A user of the container vehicle can enter the first walkway to access any of the storage containers in the first group and/or the second group. The user can enter the second walkway to access the storage containers in the third group and the fourth group, and so on. The user is covered by the roof when standing on any of the walkways. The container vehicle may have different arrangements of storage containers and walkways in other embodiments.

Referring now back to FIG. 2, the container vehicle may include at least one door panel 234 mounted along the first exterior side and/or the second exterior side of the container vehicle. Each door panel aligns with one of the walkways and hallways. The door panel is movable between a raised position and a lowered position. In the raised position, the door panel blocks the corresponding hallway and defines an outer wall 236 of the container vehicle. In the lowered position, the door panel does not block the corresponding hallway. The door panel defines an entryway for permitting an individual user to enter the hallway along the walkway. In the illustrated embodiment, the container vehicle includes four door panels spaced apart along the first exterior side of the container vehicle. As shown in FIG. 3, the container vehicle includes four additional door panels along the second exterior side of the container vehicle. The door panels are located at opposite ends of each of the walkways. In FIG. 2, two door panels 234A, 234B are in the raised position, and two door panels 234C, 234D are in the lowered position.

When in the lowered position, the door panel defines a ramp or bridge that provides an entryway onto the container vehicle. All eight door panels are shown in the lowered position in FIG. 3. A door panel in the lowered position may have a first end mounted at the platform and a second end in contact with the ground, as shown in FIG. 2, to provide a ramp for a user on the ground to climb up to the walkway on the platform. If the container vehicle is next to a raised platform, such as at a station, the second end may be in contact with the raised platform to define a bridge for a user on the raised platform to walk across a gap onto the walkway of the vehicle. Having door panels on both side of the container vehicle can permit entrance from a raise platform of a station that is located on either side of the vehicle system. In an embodiment, one or more actuators (e.g., the actuators in FIG. 1) move the door panels between the raised and lowered positions without requiring manual effort. For example, an operator of the propulsion-generating vehicle may provide an operator command, via an input device, to raise or lower one or more of the door panels. The operator command may be conveyed to the one or more actuators that perform the raising or lowering operation. The actuators may be electric, pneumatic, or the like. The door panels may transition between the raised and lowered positions by pivoting about a fixed pivot point at the platform.

The container vehicle may travel with the door panels secured in the raised position. In an embodiment, the door panels in the raised position define portions of the exterior sides of the container vehicle. Side walls 238 of the storage containers may define other portions of the exterior sides of the container vehicle. For example, the container vehicle optionally does not include conventional side walls that surround the storage containers along the first and second exterior sides. Rather, the side walls 238 of the storage containers themselves may define portions of the exterior sides. Omitting rigid, elongated vehicle side walls may allow for simpler, more efficient loading and unloading of the storage containers onto the container vehicle. For example, the storage containers may be loaded onto the platform from the side, as described in more detail herein with reference to FIG. 6. In an alternative embodiment, container vehicle includes at least one side wall that extends the length of the chassis along at least one of the first or second exterior side of the vehicle, and the storage containers are held interior of the side wall(s) between the platform and the roof.

Figure 4:
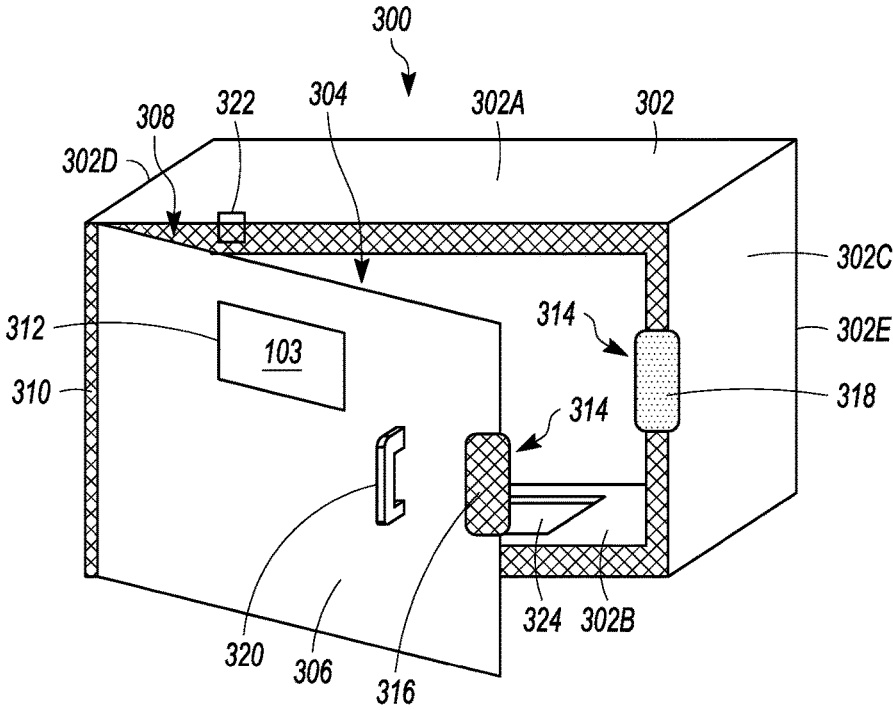
FIG. 4 is a perspective view of a storage container of the transportation storage system according to an embodiment.

FIG. 4 is a perspective view of a storage container 300 of the transportation storage system according to an embodiment. The storage container may be one of the storage containers on the container vehicle shown in FIG. 1 and/or the container vehicle in FIGS. 2 and 3. The storage container includes multiple module walls 302 that define a cavity 304. The module walls may include a top wall 302A, a bottom wall 302B, a first side wall 302C, a second side wall 302D, and a back wall 302E. The cavity is sized to accommodate an object for shipping within the storage container.

The storage container includes a container door 306 mounted to the module walls at the access end 308 of the storage container. The container door encloses the cavity when the container door is in a closed state. The container door in the illustrated embodiment is shown in an open state. In the open state, the cavity is exposed and visible through the access end. An individual is able to deposit an object into the cavity and/or remove an object from the cavity through the open access end. In the illustrated embodiment, the container door pivots between the closed and open states about a fixed axis 310. In an alternative embodiment, the container door may have other mechanisms for selectively enclosing and exposing the access end of the storage container. For example, the container door may have two discrete segments that pivot along different axes. In another example, the container door may slide between the open and closed states, rather than pivoting. In an alternative embodiment, the module walls may include a front wall at the access end, and the container door covers an opening in the front wall when in the closed state.

In the illustrated embodiment, the container door includes a placard 312 that provides an identifier of the storage container. The identifier may uniquely identify the storage container relative to all of the other storage containers on the container vehicle. The identifier may be an alphanumeric sequence, such as "103" in the illustrated embodiment.

The storage container has a lockset 314 mounted to the storage container. The lockset selectively locks the container door in the closed state. In an embodiment, a first portion 316 of the lockset is mounted on the container door, and a second portion 318 of the lockset is mounted on the first side wall at the access end. The first and second portions are complementary. For example, one of the first and second portions may include an extendable bolt, and the other of the first and second portions may have a plate that defines an opening for receiving the bolt therein. When the container door is closed, the bolt aligns with the opening. As the lockset is locked, the bolt extends from a retracted position to an extended position into the opening of the plate. When the bolt is within the opening of the plate, the container door is secured in the closed position and cannot be manually opened by an individual pulling on a handle 320 of the container door. The lockset is controlled via information (e.g., a key) provided to the lockset. Suitable types of information that can be provided to access the container include a physical key (e.g., a key card, RFID tag, or other identification tag), a code (e.g., PIN, login/password or the like), biometric information, a signal (e.g., near field communication (NFC) using a mobile external device), and/or the like.

In an embodiment, the lockset is an electronic lockset. The electronic lockset may be unlocked in response to receiving an unlock signal that is uniquely associated with the particular storage container. For example, an unlock signal that unlocks the lockset of a first storage container would not be able to unlock the lockset of another storage container onboard the vehicle. When unlocked, the container door is permitted to be opened to access the cavity. The electronic lockset may lock in response to receiving a user command, via an input device, to lock the container door. The electronic lockset may also automatically lock when the container door is closed and at least a designated amount of time has passed since the container door was open. The unlock signal may be transmitted by an external device, such as the external device in FIG. 1. In an embodiment, the external device may be a smartphone carried by a user. In another embodiment, the electronic lockset may include a user interface, such as a touchpad or key pad, for receiving a manually-entered key code. Optionally, the electronic lockset may include a digital scanner configured to scan the face, eye, fingerprint, or the like of a user.

Optionally, the storage container may include an actuator to automatically open and close the container door. For example, upon receiving a verified key, code, or unlock signal, the lockset may unlock and the actuator may be activated to open the door.

The storage container may include one or more sensors for monitoring a status of the storage container. The sensors in the illustrated embodiment include a position sensor 322 that detects when the container door is open and closed and a weight sensor 324 that measures the weight of contents within the cavity. The weight sensor can be used to determine an occupancy status of the storage container. The occupancy status indicates whether or not any objects are located within the cavity. The weight sensor can also be used to flag when the weight of the contents differ from an expected weight. For example, if a user that unlocks the storage container to extract an object makes an unplanned deposit into the storage container, the weight sensor would detect that the storage container is occupied and take responsive action to notify an operator. The lockset may include an incorporated sensor to monitor a lock and unlock state of the lockset. Other types of suitable sensors on the storage container may include an optical sensor (e.g., camera), a motion sensor, a proximity sensor, and the like. The sensors may be communicatively connected to a controller. The controller may be the onboard controller shown in FIG. 1. The controller receives the sensor data generated by the sensors to monitor the status and operations of the storage container over time. The sensor data can be used to update an inventory database, such as the inventory database in FIG. 1.

Figures 5, 6:
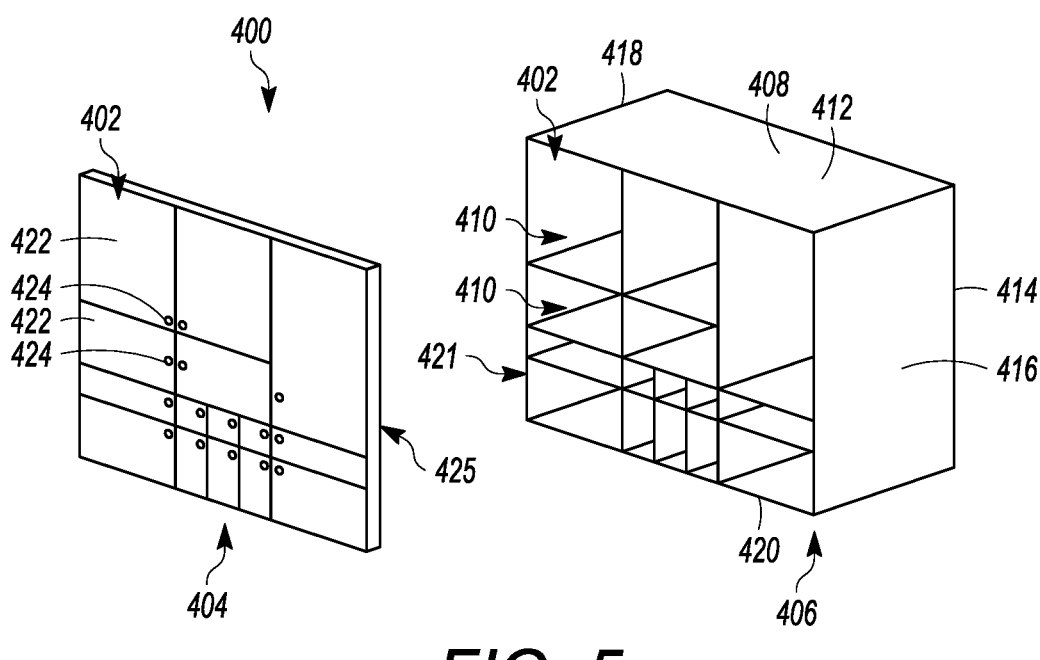
FIG. 5 illustrates a pod of plural storage containers according to an embodiment.
FIG. 6 illustrates a shelving block of the pod shown in FIG. 5 being loaded into a container vehicle according to an embodiment.

FIG. 5 illustrates a pod 400 of plural storage containers 402 according to an embodiment. The pod may represent one of the groups of storage containers shown in FIGS. 2 and 3. The storage containers of the pod are integrally joined together, such that the storage containers share components. The pod includes a face assembly 404 and a shelving block 406 that is discrete from the face assembly. The shelving block includes module walls 408 that define individual cavities 410 or compartments for housing the objects to be transported. Two adjacent cavities are separated by a single, shared interior module wall. The shelving block includes a top wall 412, a back wall 414, two side walls 416, 418, and a bottom wall 420. The shelving block is open along a front 421, which enables easy access to the cavities for loading objects for shipment.

The face assembly includes container doors 422 and locksets 424 of the pod. The container doors are arranged in an array that matches the array of cavities in the shelving block. The pod is assembled by positioning the shelving block such that the front abuts against or is at least within a few centimeters of a back 425 of the face assembly. When the shelving block aligns with the face assembly, the individual storage containers are assembled.

FIG. 6 illustrates the shelving block of the pod shown in FIG. 5 being loaded into a container vehicle 500 according to an embodiment. The container vehicle may be the container vehicle shown in FIG. 2. In the illustrated embodiment, the container vehicle includes a frame 502 on the platform 504. The frame includes frame members 505 that define multiple bays 506 between the platform and the roof 508. Each of the bays 506 is sized and shaped to receive one or more storage containers therein.

In the illustrated embodiment, each bay is sized and shaped to receive a shelving block of multiple storage containers. For example, the illustrated shelving block is being loaded, by a forklift 510, into a first bay 506A through an opening along the first exterior side of the container vehicle. The face assembly 404 that is associated with the shelving block is mounted to the frame. When the shelving block is fully loaded in the bay, the cavities align with the container doors 422 to define plural storage containers. The illustrated embodiment may enhance efficiency because removing the shelving block provides bulk access to the cavities. With the shelving block removed from the container vehicle, shipping objects can easily be loaded into the cavities and/or removed from the cavities through the open shelving, without individually opening each container door. This may also reduce the risk of damage to the container doors. Afterwards, the shelving block may be re-loaded into the bay. The bays optionally may be loadable from either side. Once the shelving block is loaded into the bay, the shelving block may be secured in place via fasteners. The shelving block may be secured to the frame members of the frame. When the shelving block is loaded in the bay, the side walls of the shelving block may define portions of the exterior sides of the vehicle. The container vehicle in FIG. 6 includes additional bays 506B, 506C, 506D that are loaded with corresponding shelving blocks.

In a use scenario, a user that has ordered an item to be delivered via the container vehicle may track the location of the container vehicle on their smartphone or other external device. The user may receive a notification from the offboard entity that identifies the storage container that includes the recipient's item. For example, the notification may include an identifier for the storage container, such as 103 as shown in FIG. 4. The notification may also include additional information to assist with locating the storage container, such as a door panel identifier, hallway identifier, a bay identifier, or the like. The offboard entity may also send notifications to the user's external device if an event occurs that causes a change in the scheduled arrival time or location. For example, if the container vehicle is forced to make a detour, the offboard entity can inform the user of the new arrival location and anticipated arrival time, before the container vehicle reaches the arrival location. The offboard entity may also notify the user when the container vehicle arrives at the arrival location. The offboard entity may also transmit the unlock signal to the external device of the user. Once the user locates the particular storage container, the user may activate the external device to wirelessly emit the unlock signal. The electronic lockset may include a receiver circuit that detects and verifies the unlock signal, before unlocking the container door to allow the user to retrieve the item from inside the storage container. Although the example above describes a user that is picking up an item, a user that reserves a storage container for depositing an item to be shipped would have a similar experience.

In an embodiment, the onboard controller may automatically raise and lower the door panels of the container vehicle. For example, with reference to FIG. 3, if the container vehicle pulls up to a station which has a raised platform located along the first exterior side 230 of the container vehicle, the onboard controller may only lower the door panels that are located along the first exterior side. The door panels along the second exterior side 232 may be maintained in the raised position. The onboard controller may also determine which door panels and groups of storage containers are relevant for a given arrival location. For example, the storage containers may be filled such that users at one station retrieve objects from a first group of storage containers, and users at another station retrieve objects from a second group of storage containers. In this scenario, the controller only opens the door panel(s) that provide access to relevant groups of storage containers for the given location. This strategy may enhance security by prohibiting access to other groups of storage containers, only exposing the storage containers that need to be access at the particular stop. The onboard controller may access the information about which side of the vehicle has the pedestrian platform at a given stop and which storage containers need to be accessed for the given stop from the memory.

Prior to lowering the door panels along the first exterior side, the onboard controller verifies that the container vehicle is stationary, with brakes engaged. The onboard controller may also require propulsion-generating equipment to be turned off prior to lowering any door panels. Optionally, collision avoidance sensors may be mounted on the door panels and/or the exterior sides of the vehicle to monitor the area under the door panels and ensure that the door panels will not be lowered on any people. Suitable sensors for this task may include motion sensors, proximity sensors, optical sensors (e.g., cameras, thermal imaging cameras, etc.), and the like. The actuators that lower the door panels may automatically stop lowering a door panel in response to the collision avoidance sensors indicating that a potential collision with a person or obstacle may occur. In an embodiment, the door panels that are in the lowered state may be pivoted to the raised position by the actuators once the container vehicle is ready to relocate. The vehicle may include one or more security cameras or other sensors directed to monitor the hallways of the vehicle. The controller may use the security cameras and sensors to verify that the vehicle is unoccupied by any users before controlling the actuators to raise the door panels.

Regarding security, the transportation storage system may be designed to recognize unexpected behavior. The transportation storage system may have programmed security protocols, stored in the memory, to follow responsive to detected unexpected behavior of a user on or nearby the vehicle. For example, the controller may record and store security camera footage synchronized with access logs, reservation records, and the like. One example of unexpected behavior is if a user unlocks a storage container to remove an item as planned, then unexpectedly deposits another item into the same storage container. The unexpected deposit may be detected via analysis of sensor data generated by a weight sensor in the storage container, an optical sensor, a proximity sensor, and/or the like. In response to detecting the unregistered deposit, the controller may generate an alert that is transmitted to a dispatcher, security personnel, and/or the like. The controller may flag the account of the user that made the unregistered deposit, in case the deposit may be related to illegal activity. Furthermore, unexpected occupancy of the storage container may cause the controller to maintain the electronic lockset in the unlocked state to permit access to an operator or security personnel. The electronic lockset does not lock until the unregistered deposit is inspected, even after a designated time out period in which the lockset typically re-locks the container.

Figure 7:
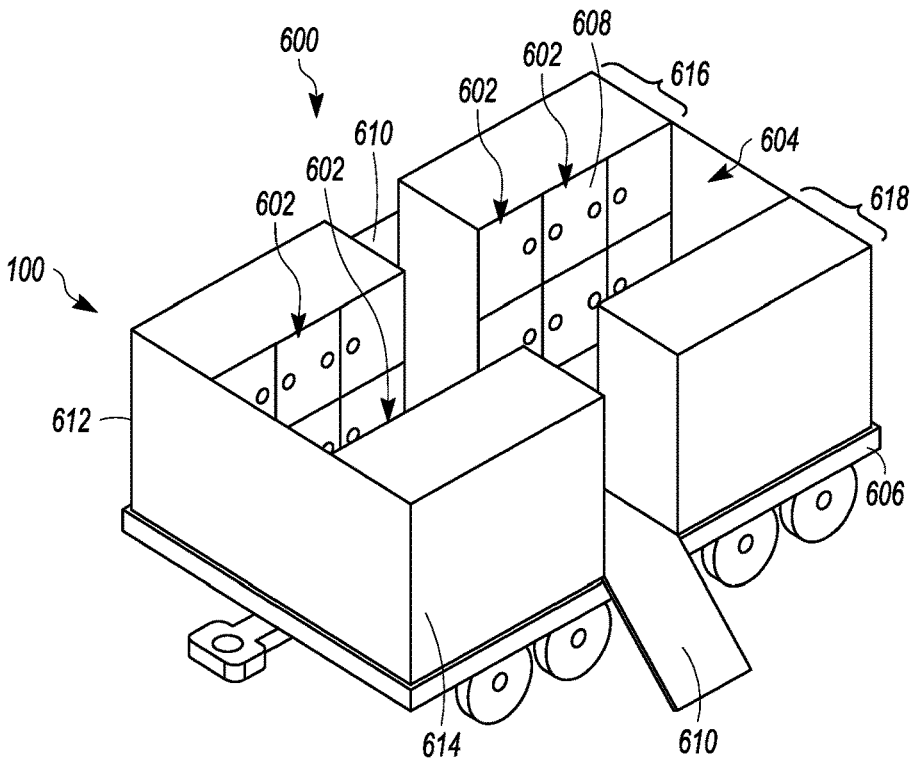
FIG. 7 is a perspective view of another container vehicle according to an embodiment.

FIG. 7 is a perspective view of a container vehicle 600 according to an embodiment. The container vehicle in FIG. 7 includes a different arrangement of storage containers 602 relative to the container vehicle shown in FIGS. 2 and 3. The container vehicle in FIG. 7 includes a center hallway 604 that extends along a longitudinal length of the platform 606. The center hallway separates a first (e.g., left) group 616 of storage containers from a second (e.g., right) group 618 of storage containers. Container doors 608 of the storage containers in both groups face the center hallway to permit an individual standing in the hallway to access any of the storage containers. The container vehicle includes a respective door panel 610 along each of a first (e.g., left) exterior side 612 of the vehicle and a second (e.g., right) exterior side 614 of the vehicle. The door panels are movable between raised and lowered positions. When lowered, the door panels provide ramps or bridges for allowing an individual to climb onboard the platform and enter the center hallway.

Figure 8:
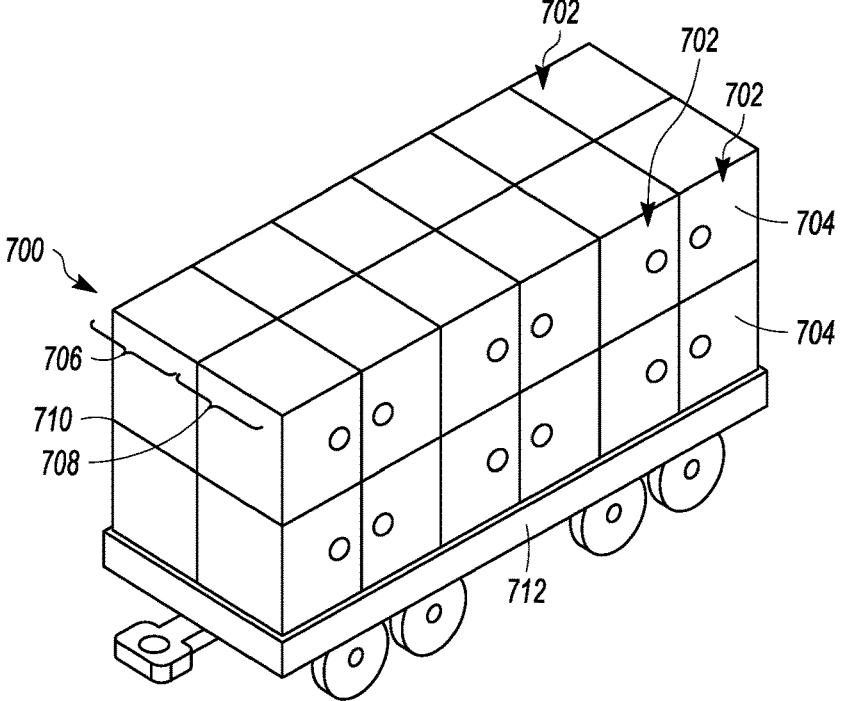
FIG. 8 is a perspective view of another container vehicle according to an embodiment.

FIG. 8 is a perspective view of a container vehicle 700 according to an embodiment. The container vehicle in FIG. 8 includes a different arrangement of storage containers 702 relative to the container vehicle shown in FIG. 7 and the container vehicle shown in FIGS. 2 and 3. The container vehicle in FIG. 8 has storage containers 702 that face outward. The storage containers are oriented such that the container doors 704 are disposed along at least one exterior side of the vehicle. The storage containers in the illustrated embodiment are arranged in two rows 706, 708. The storage containers in the first row face outward along a first exterior side 710 of the vehicle, and the storage containers in the second row face outward along a second exterior side 712 of the vehicle. The second exterior side is opposite the first exterior side. Users can access the storage containers to deposit and/or extract objects without climbing onboard the container vehicle. For example, the container vehicle may park next to a raised platform, and the users may approach the storage containers of a corresponding one of the rows while remaining on the raised platform.

FIG. 9 is a flow chart of a method 800 for providing individualized access to storage containers of a vehicle according to an embodiment. One or more operations or steps of the method may be performed by the onboard controller of the vehicle system and/or the offboard controller of the offboard entity, as shown in FIG. 1. The method may include more steps, fewer steps, and/or different steps than shown in FIG. 9.

At step 802, plural storage containers are provided on a platform of a vehicle. Each of the storage containers includes multiple module walls and a container door. The module walls define a cavity configured to receive an object, such as a package, a parcel, a good, a device, or the like. The container door is mounted to the module walls at an access end of the storage container and encloses the cavity when the container door is in a closed state. The storage containers include electronic locksets mounted to the storage containers and configured to lock the container doors in the closed state.

At step 804, the storage containers are oriented on the platform such that the container doors are accessible to an individual to extract the object from the cavity or to deposit the object into the cavity. In an embodiment, at least some of the storage containers may be oriented such that the access ends and container doors face towards a walkway onboard the vehicle, permitting access to an individual onboard the vehicle. For example, a walkway on a top side of the platform may separate a first group of the storage containers and a second group of the storage containers. Both groups may be oriented such that the access ends face towards the walkway. In another embodiment, at least some of the storage containers are oriented such that the access ends and container doors face are located along an exterior side of the vehicle and face away from the vehicle to permit walk-up access to the storage containers. Optionally, the vehicle may have some interior-facing storage containers and some exterior-facing storage containers.

Optionally, the method also includes mounting a door panel along an exterior side of the vehicle. The door panel may be mounted in a position to align with a walkway on the platform. The door panel may be movable between a raised position in which the door panel defines an outer wall of the vehicle and a lowered position in which the door panel defines an entryway for permitting an individual to enter the walkway.

Optionally, the method may also include mounting a frame on the platform. The frame defines plural bays, and each of the bays sized and shaped to receive one or more of the storage containers therein. The method optionally may include loading a pod of the storage containers into one of the bays. The loading of the pod includes securing the container doors and the electronic locksets of the pod to the frame. The loading of the pod also includes translating a block of plural shelves, representing the module walls of the storage containers, into the bay such that the shelves align with the container doors to define the storage containers.

At step 806, it is determined whether an unlock signal is received and verified. The unlock signal is received by an electronic lockset of one of the storage containers (e.g., a first storage container). The unlock signal may be transmitted by an external device held by a user, such as a smartphone. The unlock signal may be an infrared (IR) signal or the like. The electronic lockset may be configured to compare the unlock signal received to a stored signal for verifying the received signal. If the received signal matches the stored signal, the electronic lockset verifies the unlock signal. If the received signal does not match the stored signal, the unlock signal is not verified. Alternatively, the verification may be performed, at least in part by the onboard controller, which is communicatively connected to the electronic lockset.

At step 808, if the unlock signal is received and verified, the electronic lockset of the first storage container unlocks the container door to permit access to the interior cavity for depositing and/or extracting an object. If, on the other hand, no unlock signal is received, or an unlock signal is received that cannot be verified, then flow proceeds to step 809. At step 809, the electronic lockset maintains the container door in a locked state, without unlocking the door. As a result, the user is denied access to the interior cavity of the first storage container. The method may return to step 806 for continued monitoring for an unlock signal.

After unlocking the container door at step 808, the method at step 810 includes receiving sensor data indicative of a status of the first storage container. The sensor data may be generated by one or more sensors that monitor the first storage container. The sensor data may indicate (i) whether the container door is open or closed, (ii) whether the electronic lockset is locked or unlocked, and/or (iii) whether the cavity is occupied by an object or is unoccupied. For example, after validating of the unlock signal, the sensor data may be used to verify that the lockset unlocks as instructed, that the container door opens (either manually or automatically via an actuator), and that an object is either deposited into the cavity or removed from the cavity by a user. The sensor data may be received and analyzed by a controller. The controller may be the onboard controller on the vehicle system or the offboard controller at the offboard entity.

At step 812, an inventory database for the storage containers is updated based on the sensor data. For example, the controller that analyzes the sensor data may compare the status of each of the storage containers to a reservation or shipment schedule. When a verified recipient accesses a particular storage container to retrieve an ordered item, according to the reservation or shipment schedule, the sensor data can indicate when the item is picked up. For example, once the particular storage container is determined to be unoccupied, the controller may update the inventory database to reflect that the item has been delivered to the recipient. Conversely, the controller can update the inventory database to reflect the deposit of an object into a storage container. The inventory database may represent an up-to-date running record of the objects onboard the container vehicle, which can be used for auditing purposes (e.g., delivery verification).

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions for the system. During operation of one embodiment, a determination can occur by processing the inputs through the parameters of the neural network to generate a value at the output node designating that action as the desired action. This action may translate into a signal that causes the equipment to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In an embodiment, a transportation storage system is provided that includes a vehicle, plural storage containers, and electronic locksets mounted to the storage containers. The vehicle includes a chassis and a platform on the chassis. The storage containers are disposed on the platform. Each of the storage containers includes multiple module walls and a container door. The module walls define a cavity configured to receive an object. The container door is mounted to the module walls at an access end of the storage container and encloses the cavity when the container door is in a closed state. The electronic locksets are configured to lock the container doors in the closed state. Each of the electronic locksets is configured to provide access to the object within the cavity in response to receiving a corresponding unlock signal. The storage containers are oriented on the platform such that the container doors are accessible to an individual that is off-board the vehicle or that is on the platform to extract the object from the cavity or to deposit the object into the cavity.

Optionally, the vehicle includes a walkway along a top side of the platform, and at least some of the storage containers are oriented such that the access ends thereof face towards the walkway. Optionally, the storage containers include a first group of the storage containers and a second group of the storage containers separated from each other by the walkway. Optionally, the vehicle includes a door panel mounted along an exterior side of the vehicle. The door panel aligns with the walkway and is configured to be movable between a raised position in which the door panel defines an outer wall of the vehicle and a lowered position in which the door panel defines an entryway for permitting the individual to enter the walkway.

Optionally, at least some of the storage containers are oriented such that the container doors thereof are disposed along an exterior side of the vehicle.

Optionally, the vehicle includes a roof that covers the storage containers.

Optionally, the vehicle includes a frame that defines multiple bays on the platform. Each of the bays is configured to receive one or more of the storage containers therein. Optionally, the storage containers include a pod of the storage containers. The module walls of the storage containers in the pod are interconnected to define a shelving block. The container doors and the electronic locksets of the storage containers in the pod are mounted to the frame. The shelving block is removable from the corresponding bay relative to the container doors and the electronic locksets on the frame.

Optionally, the electronic lockset of each storage container is configured to unlock the respective container door, to permit opening the container door, in response to receiving the corresponding unlock signal.

Optionally, the vehicle is a rail vehicle configured to travel on rails of a track.

Optionally, each of the storage containers further includes one or more sensors configured to generate sensor data indicative of (i) whether the container door is open or closed, (ii) whether the electronic lockset is locked or unlocked, and/or (iii) whether the cavity is occupied by the object or is unoccupied. Optionally, the transportation storage system further includes one or more processors configured to update an inventory database for the storage containers onboard the vehicle based on the sensor data generated by the one or more sensors.

In an embodiment, a method is provided that includes providing plural storage containers on a platform of a vehicle. Each of the storage containers includes multiple module walls and a container door. The module walls define a cavity configured to receive an object. The container door is mounted to the module walls at an access end of the storage container and encloses the cavity when the container door is in a closed state. The storage containers also include electronic locksets mounted to the storage containers and configured to lock the container doors in the closed state. The method includes orienting the storage containers on the platform such that the container doors are accessible to an individual that is off-board the vehicle or that is on the platform to extract the object from the cavity or to deposit the object into the cavity. Responsive to receiving an unlock signal, the method includes unlocking the respective container door of one of the storage containers associated with the unlock signal, via a corresponding one of the electronic locksets, to permit opening the container door for extracting the object or depositing the object.

Optionally, the method also includes arranging a first group of the storage containers and a second group of the storage containers on opposite sides of a walkway along a top side of the platform. The orienting of the storage containers includes orienting the first and second groups such that the access ends of the storage containers thereof face towards the walkway.

Optionally, the method also includes mounting a door panel along an exterior side of the vehicle. The door panel is mounted in a position that aligns with the walkway. The door panel is mounted to be movable between a raised position in which the door panel defines an outer wall of the vehicle and a lowered position in which the door panel defines an entryway for permitting the individual to enter the walkway.

Optionally, the method also includes mounting a frame on the platform, where the frame defines plural bays. Each of the bays is sized and shaped to receive one or more of the storage containers therein. Optionally, the method includes loading a pod of the storage containers into one of the bays. The loading of the pod includes securing the container doors and the electronic locksets of the pod to the frame and translating a block of plural shelves, representing the module walls of the one or more storage containers, into the bay such that the shelves align with the container doors to define the storage containers.

Optionally, the method also includes receiving sensor data associated with one of the storage containers. The sensor data is indicative of (i) whether the container door is open or closed, (ii) whether the electronic lockset is locked or unlocked, and/or (iii) whether the cavity is occupied by the object or is unoccupied. The method includes updating an inventory database for the storage containers based on the sensor data.

In an embodiment, a transportation storage system is provided that includes a vehicle having a platform, plural storage containers disposed on the platform, lockset mounted to the storage containers, and a door panel mounted along an exterior side of the vehicle. Each of the storage containers includes multiple module walls and a container door. The module walls define a cavity configured to receive an object. The container door is mounted to the module walls at an access end of the storage container and encloses the cavity when the container door is in a closed state. The platform includes a walkway along a top side of the platform between a first subset of the storage containers and a second subset of the storage containers. The storage containers in the first and second subsets are oriented such that the access ends face towards the walkway. The lockets are configured to lock the container doors in the closed state. Each of the locksets is unlockable, to permit opening the container door of a corresponding storage container, via receipt of a key that is uniquely associated with the storage container. The door panel aligns with the walkway and is movable between a raised position in which the door panel defines an outer wall of the vehicle and a lowered position in which the door panel defines an entryway. The entryway is for permitting an individual to enter the walkway and access the first and second subsets of the storage containers on the platform.

Optionally, the locksets are electronic locksets, and each electronic lockset is configured to unlock the container door of the corresponding storage container in response to receiving a wireless unlock signal, representing the key, from an external device possessed by an individual in a vicinity of the storage container.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A transportation storage system, comprising:
a vehicle including a chassis and a platform on the chassis;
plural storage containers disposed on the platform, each of the storage containers comprising multiple module walls and a container door, the module walls defining a cavity configured to receive an object, the container door mounted to the module walls at an access end of the storage container and encloses the cavity when the container door is in a closed state;
a frame that defines multiple bays on the platform, each of the bays configured to receive one or more of the storage containers therein; and
electronic locksets mounted to the storage containers and configured to lock the container doors in the closed state, wherein each of the electronic locksets is configured to provide access to the object within the cavity in response to receiving a corresponding unlock signal, wherein the storage containers are oriented on the platform such that the container doors are accessible to an individual that is off-board the vehicle or that is on the platform to extract the object from the cavity or to deposit the object into the cavity,
wherein the storage containers include a pod of the storage containers, wherein the module walls of the storage containers in the pod are interconnected to define a shelving block, wherein the container doors and the electronic locksets of the storage containers in the pod are mounted to the frame and the shelving block is removable from the corresponding bay relative to the container doors and the electronic locksets on the frame.

2. The transportation storage system of claim 1, wherein the electronic lockset of each storage container is configured to unlock the respective container door, to permit opening the container door to provide access to the object within the cavity, in response to receiving the corresponding unlock signal.

3. The transportation storage system of claim 1, wherein the vehicle is a rail vehicle configured to travel on rails of a track.

4. The transportation storage system of claim 1, wherein each of the storage containers further includes one or more sensors configured to generate sensor data indicative of one or more of (i) whether the container door is open or closed, (ii) whether the electronic lockset is locked or unlocked, or (iii) whether the cavity is occupied by the object or is unoccupied.

5. The transportation storage system of claim 4, further comprising one or more processors configured to update an inventory database for the storage containers onboard the vehicle based on the sensor data generated by the one or more sensors.

6. A method comprising:
providing plural storage containers on a platform of a vehicle, each of the storage containers includes multiple module walls and a container door, the module walls defining a cavity configured to receive an object, the container door mounted to the module walls at an access end of the storage container and encloses the cavity when the container door is in a closed state, the storage containers further comprising electronic locksets mounted to the storage containers and configured to lock the container doors in the closed state;
mounting a frame on the platform, the frame comprising frame members that define plural bays, each of the bays sized and shaped to receive one or more of the storage containers therein;
loading a pod of the storage containers into one of the bays, the loading of the pod comprising securing the container doors and the electronic locksets of the pod to the frame and translating a block of plural shelves, representing the module walls of the one or more storage containers, into the bay such that the shelves align with the container doors to define the storage containers;
orienting the storage containers within the bays of the frame such that the container doors are accessible to an individual that is off-board the vehicle or that is on the platform to extract the object from the cavity or to deposit the object into the cavity; and
responsive to receiving an unlock signal, unlocking the respective container door of one of the storage containers associated with the unlock signal, via a corresponding one of the electronic locksets, to permit opening the container door for extracting the object or depositing the object.

7. The method of claim 6, further comprising:

receiving sensor data from one or more sensors associated with one of the storage containers, the sensor data indicative of one or more of (i) whether the container door is open or closed, (ii) whether the electronic lockset is locked or unlocked, or (iii) whether the cavity is occupied by the object or is unoccupied; and updating an inventory database for the storage containers, via one or more processors, based on the sensor data.

\* \* \* \* \*

24